United States Patent

Jenkins

[15] 3,674,719
[45] July 4, 1972

[54] PROCESS FOR PREPARING MICROPOROUS, OPEN-CELLED CELLULAR POLYAMIDE, POLYESTER AND POLYACETAL STRUCTURES

[72] Inventor: Francis Edward Jenkins, Wilmington, Del.

[73] Assignee: E. I. du Pont de Nemours and Company, Wilmington, Del.

[22] Filed: Dec. 23, 1970

[21] Appl. No.: 101,172

[52] U.S. Cl............260/2.5 M, 260/31.2 N, 260/31.2 R, 260/31.2 XA, 260/32.8 N, 260/32.8 R, 260/33.4 R, 260/33.8 R
[51] Int. Cl............C08j 1/26, C08j 1/28
[58] Field of Search............260/2.5 M

[56] References Cited

UNITED STATES PATENTS 3,450,650    6/1969    Murata............260/2.5 M

FOREIGN PATENTS OR APPLICATIONS 1,138,121    12/1968    Great Britain............260/2.5 M Primary Examiner—Murray Tillman
Assistant Examiner—Morton Foelak
Attorney—Nicholas J. Masington, Jr.

[57] ABSTRACT

A process for preparing microporous, open-celled cellular polyamide, polyacetal and polyester structures which comprises (a) dissolving the starting polymer in formic acid, hexafluoroisopropyl alcohol, hexafluoroacetone hydrate or mixtures thereof; (b) dispersing in the resulting solution a liquid chlorofluorocarbon; (c) cooling the dispersion to at least the solidification temperature of the chlorofluorocarbon; and (d) removing the chlorofluorocarbon from the dispersion at a temperature of from about 0° C. to the solidification temperature of said chlorofluorocarbon.

17 Claims, No Drawings

PROCESS FOR PREPARING MICROPOROUS, OPEN-CELLED CELLULAR POLYAMIDE, POLYESTER AND POLYACETAL STRUCTURES

BACKGROUND OF THE INVENTION

1. Field of the Invention

This invention relates to a novel process for making microporous, open-celled cellular structures of polyamides, polyesters, and polyacetals in the presence of selected chlorofluorocarbons.

2. Prior Art

Cellular polymeric structures are well known in the art and have found extensive use as insulating materials, construction materials, packaging and the like. Such cellular structures have been made from a variety of polymers, including polyurethanes, polystyrene, cellulose esters, and polyvinyl chloride.

A number of methods are available for the preparation of polymeric cellular structures. In one method, a molten thermoplastic polymeric material is thoroughly mixed with a gas or a volatile liquid, and the mixture is heated in a closed chamber under pressure. The hot mixture is then released from the closed chamber through a suitable die or opening. At lower pressure, the gas or the low boiling liquid expands and volatilizes, leaving a permanent cellular structure on cooling.

In another method, molten thermoplastic polymer is thoroughly mixed with solids of finite size which after cooling are subsequently extracted from the polymer mass with selected solvents, leaving behind a cellular structure.

Still another method is to compact a powdered or granular polymer at a temperature slightly below its melting temperature, thus forming an interstitial polymer structure.

In yet another method, the polymer is dissolved in a hot liquid which is not a good solvent for the polymer at room temperature. The solution then is cooled, and the solvent is removed by leaching with water or by distillation at reduced pressure (cf. U.S. Pat. No. 3,427,179 to W. J. Davis).

An additional method, which is often used in the preparation of microporous cellular sheet or film, consists in treating a solution of a polymer with a liquid which is miscible with the polymer solvent but is a nonsolvent for the polymer, thereby coagulating the polymer. The coagulating liquid is then removed, leaving behind a porous cellular sheet or film of the polymer.

There are, however, various disadvantages manifested by these processes. Some processes, for instance, are suitable only for thermoplastic polymers which are stable in the molten state. The most apparent limitation of the prior art methods of forming cellular structure is the inability of each method to cover a broad variety of shapes of cellular materials. Coagulation of a polymer from a solution with a nonsolvent, for example, is most practical for production of porous cellular sheets or films but is of no practical use in forming other shapes.

The cellular material prepared by the above methods is either closed-celled or open-celled. Closed-celled structures contain individual cells whose size and cell wall thickness depend upon such factors as molecular weight of the polymer, type of blowing agent used, and the density of the final cellular material. The open-celled structure does not contain individual cells but is characterized by the presence of interconnecting channels throughout the cellular structure. Closed-celled polymeric materials are especially suitable for those applications where the transmission of vapor would be undesirable, such as in thermal insulation. Open-celled polymeric materials, on the other hand, are especially suitable for those applications where transmission of vapor would be desirable. Microporous open-celled polymeric materials, such as certain polyurethane foams have found acceptance as synthetic leather-like poromeric structures.

While closed-celled polymeric materials can be readily made by known methods of the art, open-celled polymeric structures are usually much more difficult to obtain. There is therefore a need for a reliable and convenient process for making open-celled polymer materials of any desired shape and this need is satisfied by the process of the present invention.

SUMMARY OF THE INVENTION

The present invention is directed to a process for preparing microporous open-celled cellular structures from a polymer selected from polyamide, polyacetal and polyester.

The process comprises the following steps:

a. dissolving at least 0.3 weight per volume percent of a normally solid polyamide, polyacetal or polyester in formic acid, hexafluoroisopropyl alcohol, hexafluoroacetone hydrate or mixtures thereof to form a polymer solution with the proviso that formic acid is utilized either alone or in mixture only when the selected polymer is polyamide;

b. dispersing in the resulting solution from about equal to about ten times its volume of a liquid chlorofluorocarbon or mixture of chlorofluorocarbons having a boiling point in the range of from about 10° to 150° C., a melting point in the range of from about −40° to 125° C. (melting point being lower than boiling point), an entropy of fusion of less than 10 calories/°K/mole (heat of fusion [cal./mole]/temperature of fusion [°K]), a plastic flow index of at least 0.1 g./10 min. at the reduced temperature of 0.96 to 0.99 (reduced temperature equals T° K at which flow measured/T° K of melting point; plastic flow being a measurement of the rate of extrusion as measured on a plastometer according to ASTM–D 1238–65T) and a solubility in water of less than about 2 weight percent, to form a liquid dispersion, at a temperature below the atmospheric boiling point of the lowest boiling component of the polymer solution;

c. cooling the dispersion to at least the solidification temperature of the lowest melting chlorofluorocarbon present, thus causing the dispersed chlorofluorocarbon to solidify; and d. removing both the solvent and the chlorofluorocarbon therefrom at a temperature of from about 0° C. to the solidification temperature of the chlorofluorocarbon.

DESCRIPTION OF THE INVENTION

The process of the present invention is useful for the preparation of microporous open-celled structures of polyamides, polyesters, and polyacetals. Cellular structures of these polymers are difficult to produce by the conventional methods of the art. Because of their rather high melting temperature, these polymers cannot be processed in molten state without extensive thermal degradation. These polymers also are insoluble at room temperature in most organic liquids and generally have not been foamed by solution processes.

A polyamide is defined as a synthetic, linear, condensation-type polymer whose repeating units contain the amide group,

these groups being integral members of the linear polymeric chain. Polymers of this type are well known in the art. Polyamides may be derived from dibasic acids such as oxalic, succinic, adipic, suberic, and sebacic and diamines such as ethylenediamine, pentamethylenediamine, hexamethylenediamine, decamethylenediamine, tetradecamethylenediamine or di(p-aminocyclohexyl)methane. A polyamide can also contain one or more aromatic groups either in its acid portion or its amine portion, as, for example, in poly(p-phenyleneterphthalamide), or poly(m-phenyleneisophthalamide/terephthalamide). Polyamides can also be derived from monoaminomonocarboxylic acids or their cyclic lactams. Typical examples of such polymers are polycaprolactam (Nylon 6) and poly(11-aminodecanoic acid).

A polyester is defined as synthetic, linear, condensation-type polymer whose repeating units contain the ester group,

these groups being integral members of the linear polymer chain. Polyesters are well known in the art. Polyesters may be those derived from aliphatic dibasic acids such as oxalic, succinic, glutaric, adipic, and sebacic and glycols such as ethylene glycol, propylene glycol, trimethylene glycol, hexamethylene glycol, and decamethylene glycol; from aromatic dicarboxylic acids such as terephthalic acid and isophthalic acid and ethylene glycol; or from hydroxy acids such as hydroxypivalic, α-hydroxyisobutyric, ω-hydroxycaproic or ω-hydroxydecanoic acids.

A polyacetal is defined as synthetic, high molecular weight, linear polymer containing acetal oxygens as integral part of the linear polymeric chain. These polymers are characterized by the presence of the repeating acetal unit

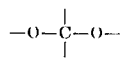

Polyacetals are well known in the art. Polyoxymethylene or polyformaldehyde, and particularly polyoxymethylene stabilized by acylation of its terminal hydroxyl groups are well known.

Polyamides, polyesters and polyacetals which are normally solid and, therefore, of high molecular weight are in general poorly soluble in most organic liquids. Thus, the polymers useful in the process of the present invention are insoluble in conventional solvents such as methanol, ethanol, isopropyl alcohol, dioxane, trioxane, tetrahydrofuran, acetone, and methyl ethyl ketone.

Each of the above polymers can, however, be dissolved in at least one of the following solvents: formic acid, hexafluoroisopropyl alcohol, and hexafluoroacetone hydrates.

Formic acid is a commonly available commercial product. Hexafluoroisopropyl alcohol, or specifically 2H-hexafluoro-2-propanol, can be made by the reduction of hexafluoroacetone either by the method of Middleton described in U.S. Pat. No. 3,418,337 or by the method of Swamer described in U.S. Pat. No. 3,468,964.

Hexafluoroacetone is commercially available. It forms two hydrates, namely the monohydrate (perfluoro-2,2-propanediol) melting at 79° C., and a liquid sesquihydrate. While the sesquihydrate is more practical to use as a solvent and is more stable, both hydrates dissociate on heating with formation of water and free hexafluoroacetone. The latter is a toxic gas under normal temperature and pressure conditions. It is, therefore, recommended that heating of hexafluoroacetone hydrates be avoided and that these materials be used with adequate ventilation.

All the above solvents form strong hydrogen bonds, and this property contributes to their good dissolving power for polar polymers, such as those contemplated by the process of the present invention. In addition, all these solvents are soluble in or miscible with water, but are immiscible with the chlorofluorocarbons useful in the present process.

It is necessary for the successful operation of the present process that the polymer be soluble in the selected solvent to the extent of at least 0.3 percent (w/v), since cellular structure obtained from a polymer solution of any lower concentration would be too fragile and friable for practical applications. It also would be too costly to handle large volumes of very dilute solutions and to remove and recover the solvent.

Since the void, i.e., porosity, content of the cellular structure is partially determined by the concentration of the polymer solution in the process of this invention, it is undesirable to use polymer solution whose polymer concentration is so high as to give cellular structures with a void content of, say, less than about 2 percent. Such cellular material while still microporous and open-celled would be almost indistinguishable from the original bulk polymer in physical properties. It is therefore preferable that the polymer concentration not exceed about 50 percent (w/v).

High molecular weight polyamides are soluble in all three solvents, i.e. formic acid, hexafluoroisopropyl alcohol, and hexafluoroacetone hydrates. Dissolution in formic acid is slow at room temperature, but can be accelerated by heating. High molecular weight polyesters and polyacetals are not sufficiently soluble in formic acid. Both classes of polymers are, however, very soluble in hexafluoroisopropyl alcohol and in hexafluoroacetone hydrates.

The chlorofluorocarbons useful in the process of this invention should possess the following characteristics: (1) a boiling point in the range of from about 10° to 150° C.; (2) a melting point in the range of from about −40° to 125° C. (melting point being lower than boiling point); (3) an entropy of fusion of less than 10 calories/°K/mole (heat of fusion [cal./mole] /temperature of fusion [°K]); (4) a plastic flow index of at least 0.1 g./10 min. at the reduced temperature of 0.96 to 0.99 (reduced temperature equals T° K at which flow measured/T° K of melting point; plastic flow being a measurement of the rate of extrusion as measured on a plastometer according to ASTM-D 1238-65T), and (5) a solubility in water of less than about 2 weight percent.

The preferred chlorofluorocarbons of this invention include 1,1,1,2,2-pentachloro-2-fluoroethane, 1,1,2,2-tetrachloro-1,2-difluoroethane, 1,1,1,2-tetrachloro-2,2-difluoroethane, 1,1,1-trichloro-2,2,2-trifluoroethane, 1,2-dichlorodecafluorocyclohexane, 1,1,2,2-tetrachloro-perfluorocyclobutane, 1,2-dichloroperfluorocyclobutane, 1-chloroperfluorocyclobutane, 1,1,2-trichloro-1,2,2-trifluoroethane, 1,1,1,3-tetrafluoro-2,2,3,3-tetrachloropropane, 1,1,1,3,3-pentafluoro-2,2,3-trichloropropane, 1,1,1,3,3,3-hexafluoro-2,2-dichloropropane, 1,1,1,4,4,4-hexafluoro-2,2,3,3-tetrachlorobutane and mixtures thereof. The melting points and the boiling points of these chlorofluorocarbons are shown in Table I below.

TABLE I

| Chlorofluorocarbon | Melting point, °C. | Boiling point, °C. |
|---|---|---|
| CCl₃—CCl₂F | 100 | 137 |
| CCl₂F—CCl₂F | 23.5 | 92.8 |
| CCl₃—CClF₂ | 40.6 | 91.5 |
| CCl₂F—CClF₂ | −35. | 47.5 |
| CCl₃—CF₂ | 14 | 45.7 |
| CF₃—CCl₃—CCl₂F | 41.7 | 112.4 |
| CF₃CCl₂—CClF₂ | −1.3 | 72 |
| CF₃—CCl₂—CF₃ | 3. | 33 |
| CF₃—CCl₂—CCl₂—CF₃ | 85.5 | 131-136 |
| CF₂—CF₂—CCl₂—CCl₂ | 84.8 | 136 |
| CF₂—CF₂—CClF—CClF | −15.1 | 59.9 |
| CF₂—CF₂—CF₂—CClF | −39.1 | 25.6 |
| CF₂—CF₂—CF₂—CF₂—CClF—CClF | 34 | 108 |

It can be seen from the above table that these chlorofluorocarbons have fairly narrow liquid temperature ranges. Another important property of these chlorofluorocarbons is that, when mixed, they have solidification temperatures which vary linearly with the composition of the components; i.e., a eutectic is not formed. Table II below shows the solidification temperature of mixtures of CCl₂FCCl₂F and CCl₃CClF₂ (chlorofluorocarbons Nos. 1 and 2 in the above table), as a function of the CCl₃CClF₂ content in the mixture.

TABLE II

| Wt. % CCl₃CClF₂ in mixture | Freezing Point of CCl₃CClF₂/CCl₂F CCl₂F mixtures, °C. |
|---|---|
| 0 | 26.0 |
| 10 | 27.4 |
| 20 | 28.9 |
| 30 | 30.4 |
| 40 | 31.8 |
| 50 | 33.3 |
| 60 | 34.7 |
| 70 | 36.2 |

| | |
|---|---|
| 80 | 37.7 |
| 90 | 39.1 |
| 100 | 40.6 |

It is thus possible and often advantageous to use a mixture of chlorofluorocarbons in the process of this invention. The preferred chlorofluorocarbon is 1,1,1,2-tetrachloro-2,2-difluoroethane. The preferred mixture of chlorofluorocarbons is a mixture of 1,1,1,2-tetrachloro-2,2-difluoroethane and 1,1,2,2-tetrachloro-1,2-difluoroethane. Both are solid at room temperature, yet can be removed by evaporation under very mild conditions.

The chlorofluorocarbons suitable in the present process are immiscible with, or at most very slightly soluble in formic acid, hexafluoroisopropyl alcohol, or a hexafluoroacetone hydrate, which are the polymer solvents employed in this process.

In the process of this invention, a polyamide, polyester or polyacetal having a solubility of at least 0.3 percent (weight/volume) is dissolved in a solvent selected from the group consisting of formic acid, hexafluoropropyl alcohol and hexafluoroacetone hydrate, with the proviso that if formic acid solvent alone or in mixture with any of the other solvents is utilized, only a polyamide will be dissolved therein. Mixtures of two or more of these solvents may be used. Therefore, at least 0.3 weight per volume percent of the polymer is dissolved in the selected solvent. Heating, either at atmospheric or autogeneous pressure, usually facilitates the dissolution.

The chlorofluorocarbon to be used is then added with agitation at a temperature below the atmospheric boiling point of the lowest boiling component of the polymer solution. The chlorofluorocarbon must be liquid at the time of addition and thus is usually first heated above its melting point.

The resulting dispersion is cooled by any art-known means with continuing agitation until a thick paste-like mixture is obtained. This occurs at or below the solidification temperature of the lowest melting chlorofluorocarbon present thus causing the dispersed chlorofluorocarbon to solidify. This paste-like mixture can be shaped, molded, pressed or extruded.

The chlorofluorocarbon and the polymer solvent may be removed under vacuum at a low temperature leaving behind a microporous, cellular structure of the polymer whose shape and dimensions are essentially those of the original polymer dispersion.

Since both the chlorofluorocarbon and the polymer are insoluble in water, while the polymer solvent is very soluble, it is also possible to treat the cooled dispersion with cold water to precipitate the polymer. A solvent-water phase and a mixture of the polymer and solid chlorofluorocarbon results. The solvent-water mixture is then removed by any conventional method, such as, e.g., decantation or filtration, leaving behind an intimate mixture of the polymer and the solidified chlorofluorocarbon. Such intimate mixture of the polymer and the chlorofluorocarbon is plastic and malleable and may also be molded, pressed, shaped or extruded.

The chlorofluorocarbon may be removed from this intimate mixture by sublimation at a temperature of from about 0° C. to the solidification temperature of the chlorofluorocarbon giving an open-celled structure of a high void content. While the sublimation can be carried out at any effective temperature, it is most efficient to operate at about 3°–5° C. below the solidification temperature of the chlorofluorocarbon.

The chlorofluorocarbon may also be separated from the intimate mixture of the polymer and the chlorofluorocarbon by aspiration at a temperature above the solidification temperature of the chlorofluorocarbon but below its atmospheric boiling point. In this procedure the liquid chlorofluorocarbon is first aspirated rapidly, removing substantially all of the chlorofluorocarbon and the residual chlorofluorocarbon is vaporized away from the polymer. Removal of the chlorofluorocarbon by aspiration usually results in a microporous structure which has a lower void content than that produced by the sublimation procedure.

While only chlorofluorocarbons are discussed herein, it is recognized that other non-chlorofluorocarbon solvents, e.g., cyclohexane, could likewise be utilized in the process of this invention; however, they lack the efficacy manifested by chlorofluorocarbons meeting the parameters set out herein.

A very important and valuable feature of this invention is that a plastic, pliable, moldable, solidified chlorofluorocarbon is obtained on cooling, and that a plastic, pliable, moldable and extrudable intimate mixture of the polymer with the solidified chlorofluorocarbon is obtained on adding water to the chilled dispersion. The above plastic and pliable mixtures may be partially oriented by rolling unidirectionally or bidirectionally to provide a cellular structure with improved strength in the direction of orientation. These mixtures thus can be formed and processed in many ways. They can be, for example:

1. extruded, molded or shaped into any desired shape and then converted into a cellular structure which will have the shape and the dimensions of the original mixture;
2. coated on supports of various types and then converted to a microporous, open-celled, supported cellular structure;
3. layered on top of a plastic mixture of another polymer, then converted to a laminated cellular structure;
4. milled with a finely divided solid, then converted to a cellular structure containing uniformly dispersed solids;
5. partially oriented by shearing, rolling, or stretching unidirectionally or bidirectionally, then converted to a partially oriented cellular structure.

It is also possible to prepare particulate microporous cellular structures which have the appearance of finely divided polymer powder by a slight variation in the above-described process. Each particle, however, has open-celled microporous structure and, consequently, a very large surface area. The present invention thus provides a convenient and useful method for preparing either a coherent microporous cellular structure or a particulate microporous cellular structure. It is to be noted that with many polymers, especially those which have both toughness and high elongation, polymer powders are obtained with great difficulty by the usual grinding process. Generally, grinding must be carried out at low temperatures, e.g., Dry Ice temperature or even lower.

The particulate, microporous, cellular, polymeric structures are prepared by adding to the warm dispersion of the chlorofluorocarbon and the polymer solution a surfactant in an amount of up to 3 percent (w/v) of the chlorofluorocarbon/polymer solution mixture and cooling and then adding water as described previously. Removal of both the chlorofluorocarbon and the polymer solvent from the chilled semisolid dispersion in the manner previously described results in the formation of the particulate polymeric material. The surface active agents useful in the present invention are well known in the art. The suitable classes include:

1. anionic surface active agents which include, for example, fatty carboxylic acids, sulfuric esters such as sulfated alcohols and olefins, alkanesulfonic acids and alkylarylsulfonic acids;
2. cationic surface active agents which include, for example, fatty amines and quaternary ammonium compounds; and,
3. nonionic surface active agents which are generally products in which a controlled number of ether or hydroxyl groups is introduced into a hydrophobic molecule. Representative nonionic surface active agents include polyoxyalkylene ethers of higher fatty alcohols and alkylphenols such as octlyphenoxypolyethoxyethanol.

Useful surface active agents must be soluble in the chlorofluorocarbons. Use of larger quantities of a surface active agent, i.e., more than about 3 percent (w/v) is undesirable because (1) no improvement of results is observed at that level, and (2) there is a risk of possible gelation of the polymer solution.

It is also sometimes possible to obtain microporous particulate structures even without the use of any surfactant. This is especially true of polyesters and polyacetals. Although the physical interactions among the various components of the mixtures are not well understood, it appears that the particulate material tends to form more readily when the ratio of chlorofluorocarbon to polymer in the mixture is high. Conversely, when this ratio is low, coherent structures result. However, a skilled chemist can easily determine the proper amounts of the ingredients required to obtain the desired structure, coherent or particulate. As a rule, however, the use of surfactant in an amount up to 3 percent (w/v) results in cellular structures which are of a smaller and more uniform size than those obtained in the absence of the surfactant.

The process of the present invention thus provides a novel method of preparing cellular structures of polyamides, polyesters and polyacetals which are open-celled and microporous. Among the advantages of the present invention over the prior art methods are:

1. a convenient and safe range of processing temperatures which eliminates or minimizes heat degradation of the polymeric material;
2. excellent control of the porosity of the cellular structures;
3. adaptability to the preparation of particulate cellular structures;
4. formation of cellular structures that are open-celled and microporous;
5. excellent versatility in forming shaped cellular structures.

The process of the present invention is conveniently carried out batchwise. However, it will be readily apparent to those skilled in the art that the steps in the present invention are readily adaptable to a continuous process.

EXAMPLE 1

Microporous Open-Celled Structure of Polyoxymethylene

Solid polyoxymethylene (polyformaldehyde), 2.0 g. was dissolved in 15 ml. of hexafluoroisopropyl alcohol. To the solution, 20 ml. of liquid 1,1,1,2-tetrachloro-2,2-difluoroethane (m.p. 40.6° C.) were added, and the mixture was stirred vigorously. On cooling the mixture in an ice water bath with continuing stirring, there was obtained a thick, paste-like mixture. This material could be shaped, extruded, or pressed. A portion of the above, mixture was placed in a small aluminum cup, which was then placed in a conventional laboratory vacuum sublimator. The outer wall of the sublimator was cooled with ice water to 0° C., and the condensation surface for the chlorofluorocarbon and the hexafluoroisopropyl alcohol was cooled to −78° C. with a Dry Ice-acetone mixture. Subjecting the chilled mixture in the sublimator to a vacuum of approximately 1 mm. Hg. for 30 minutes, produced a microporous open-celled coherent structure of polyoxymethylene which still retained a small portion of hexafluoroisopropyl alcohol, which could be detected by its odor. This small residual amount of hexafluoroisopropyl alcohol was removed by placing the cellular material in a vacuum oven at 30° C. for 10 minutes. The final product was a coherent, microporous, open-celled polyoxymethylene, which was white and somewhat brittle. Hexafluoroacetone hydrates, used instead of hexafluoroisopropyl alcohol, give comparable results.

EXAMPLE 2

Microporous, Open-Celled Sheet of Poly(hexamethyleneadipamide)

Solid poly(hexamethyleneadipamide), 20 g., was dissolved in 200 ml. of hexafluoroisopropyl alcohol. To 20 ml. of this polyamide solution, 40 ml. of liquid 1,1,1,2-tetrachloro-2,2-difluoroethane was added, and the mixture was stirred vigorously. On cooling the mixture in an ice water bath with continuing stirring, there was obtained a thick paste-like mixture. A portion of this mixture was placed on a piece of aluminum foil and rolled into a sheet with a poly(tetrafluoroethylene) rod. The aluminum foil with the pressed sheet of the mixture was then placed in a conventional laboratory sublimiation apparatus whose outer wall was maintained at 0° C. and the condensation surface was maintained at −78° C. The chilled sheet of the paste-like mixture on the aluminum foil was subjected to a vacuum of approximately 1 mm. Hg. for 30 minutes. The polyamide sheet which was separated from the aluminum foil was coherent, microporous, and open-celled and was white, hard and tough. Formic acid or hexafluoroacetone hydrates, used in place of hexafluoroisopropyl alcohol, give comparable results.

EXAMPLE 3

Microporous Cellular Structure of Polyamide of Different Void Content

A 30 percent (w/v) solution of poly(hexamethyleneadipamide) was prepared by dissolving 120 g. of the polyamide in 400 ml. of hexafluoroisopropyl alcohol. Three 150 g. portions of the polyamide solution — designated A, B and C — were taken. Liquid 1,1,1,2-tetrachloro-2,2-difluoroethane, 150 g., 300 g. and 450 g. respectively, were added to each of the three portions of the polyamide solution. Each mixture was thoroughly mixed and cooled in an ice water bath, while the mixing was continued. In each case, a thick paste-like mixture was obtained. A portion of each of the three mixtures was subjected to sublimation as described in Example 1 to form a cellular structure of polyamide. Another portion of each of the three mixtures was coagulated in water and washed with cold running water for 24 hours. Each of the coagulated mixtures was then subjected to sublimation as described in Example 1. (Instead of sublimation, coagulated mixture can also be aspirated by placing in a Buchner funnel and applying suction.) In each case, microporous cellular structure was obtained with the following void content:

| Sample | Procedure | Void Content % |
|---|---|---|
| A | Sublimation only | 65 |
| A | Coagulation and sublimation | 63 |
| B | Sublimation only | 71 |
| B | Coagulation and sublimation | 79 |
| C | Sublimation only | 84 |
| C | Coagulation and sublimation | 83 |

EXAMPLE 4

Microporous Open-Celled Sheet of Polycaprolactam

Solid polycaprolactam (10 g.), was dissolved in 100 ml. of formic acid. Liquid 1,1,1,2-tetrachloro-2,2-difluoroethane (200 ml.) was then added to above solution and the mixture was stirred vigorously. On cooling the mixture in an ice bath with continuing stirring, there was obtained a thick, paste-like mixture, which was coagulated in cold water and washed with cold running water for 24 hours. The coagulated mass was pressed into a sheet and subjected to sublimation as described in Example 1. There was obtained a coherent sheet of cellular polycaprolactam which was snow-white, soft and flexible.

EXAMPLE 5

Microporous Open-Celled Sheet of Poly(ethylene terephthalate)

Solid poly(ethylene terephthalate) film (40 g.) was cut into small pieces and dissolved in 200 ml. of hexafluoroisopropyl alcohol. To a 100 ml. portion of the solution, 200 ml. of liquid 1,1,1,2-tetrachloro-2,2-difluoroethane were added and the mixture was stirred vigorously. On cooling the mixture in an ice bath with continuing stirring, there was obtained a thick, paste-like mixture, which was coagulated in cold water and washed with cold running water for 24 hours. The coagulated mass was pressed into sheet and subjected to sublimation as described in Example 1. There was obtained a coherent sheet of cellular poly(ethylene terephthalate) which was snow-white and somewhat brittle.

EXAMPLE 6

Particulate Open Cellular Structure Of Polyester

Solid poly(ethylene terephthalate), (50 g.), was stirred with 500 ml. of hexafluoroisopropyl alcohol to give a viscous solution resembling an organosol. To 100 ml. of this solution, 200 ml. of liquid 1,1,1,2-tetrachloro-2,2-difluoroethane was added and stirred very vigorously. On cooling the mixture in an ice bath with stirring, there was obtained a thick paste-like mixture. Removal of both the chlorofluorocarbon and hexafluoroisopropyl alcohol, as described in Example 1, left a snow-white, barely coherent microporous structure of the polyester which crumbled to a fine powder on handling. Hexafluoroacetone hydrates, used in place of the hexafluoroisopropyl alcohol, give comparable results.

EXAMPLE 7

Particulate Microporous Open-Celled Polyamide Structure

Solid polyhexamethyleneadipamide, 40 g., was dissolved in 400 ml. of hexafluoroisopropyl alcohol. To the polyamide solution, 800 ml. of liquid 1,1,1,2-tetrachloro2,2-difluoroethane was added with stirring. Surface active agent, octylphenoxypolyethoxyethanol ("Triton" X-100, Rohm and Haas), 15 g., was then dissolved in the mixture. Simultaneous cooling and coagulation were brought about by addition, with good agitation, of 400 ml. of ice-cold water. A snow-white, heavy, fine-grain coagulum was obtained which was then filtered and washed with cold water until the odor of hexafluoroisopropyl alcohol was no longer detectable. Aspiration on a Buchner funnel to remove the chlorofluorocarbon yielded a very fine, fluffy, fibrous, microporous powder of polyamide. Formic acid and hexafluoroacetone hydrates, used in place of the hexafluoroisopropyl alcohol, give comparable results.

The coherent open-celled polymeric structures made by the process of the present invention can be used in many applications such as insulating materials in areas of low humidity and low internal pressures; in poromeric materials in which vapor penetration is important, e.g., as a heat-insulating layer of a synthetic shoe-upper material; in synthetic sponges and other articles which must be able to absorb large quantities of water or other liquids; and in specialty filters.

The particulate open-celled polymeric structures made by the process of the present invention can find application in areas where highly absorbent, large surface area powders are used. These applications include: materials for column, gas and thin layer chromatography; desiccating powders; and filtration adjuvants.

This detailed description has been given for clarity of understanding only and no unnecessary limitations are to be understood therefrom. The invention is not limited to exact details shown for obvious modifications will occur to one skilled in the art.

The embodiments of the invention in which an exclusive property or privilege is claimed are defined as follows:

1. A process for preparing a microporous, cellular, open-celled structure from a normally solid polymer selected from the group consisting of polyamide, polyester and polyacetal, said process comprising the following steps:
   a. dissolving at least 0.3 weight per volume percent of the selected polymer in a solvent selected from the group consisting of hexafluoroisopropyl alcohol, hexafluoroacetone hydrate, formic acid, and mixtures thereof to form a polymer solution, with the proviso that formic acid is utilized either alone or in mixture only when the selected polymer is polyamide;
   b. dispersing in the resulting solution from about one to about ten times its volume of a liquid chlorofluorocarbon or mixture of chlorofluorocarbons having a boiling point in the range of from about 10° to 150° C., a melting point in the range of from about −40° to 125° C., an entropy of fusion of less than 10 calories/°K/mole, a plastic flow index of at least 0.1 g./10 min. at the reduced temperature of 0.96 to 0.99, and a solubility in water of less than about 2 weight percent at a temperature below the atmospheric boiling temperature of the lowest-boiling component of the polymer solution, to form a dispersion;
   c. cooling the dispersion to at least the solidification temperature of the lowest-melting chlorofluorocarbon present; and
   d. removing the solvent and the chlorofluorocarbon from the mixture.

2. A process according to claim 1 wherein the chlorofluorocarbon or mixture of chlorofluorocarbons is selected from the group consisting of 1,1,1,2,2-pentachloro-2-fluoroethane, 1,1,2,2-tetrachloro-1,2-difluoroethane, 1,1,1,2-tetrachloro-2,2-difluoroethane, 1,1,1-trichloro-2,2,2-trifluoroethane, 1,2-dichlorodecafluorocyclohexane, 1,1,2,2-tetrachloro-perfluorocyclobutane, 1,2-dichloroperfluorocyclobutane, 1-chloroperfluorocyclobutane, 1,1,2-trichloro-1,2,2-trifluoroethane, 1,1,1,3-tetrafluoro-2,2,3,3-tetrachloropropane, 1,1,1,3,3-pentafluoro-2,2,3-trichloropropane, 1,1,1,3,3,3-hexafluoro-2,2-dichloropropane, 1,1,1,4,4,4-hexafluoro-2,2,3,3-tetrachlorobutane and mixtures thereof.

3. A process according to claim 1 wherein from about 0.3 to about 50 weight per volume percent of a normally solid polymer selected from the group consisting of polyamide, polyester and polyacetal is dissolved in the selected solvent.

4. The process of claim 1 in which the solvent is removed by evaporation and the chlorofluorocarbon is removed by sublimation at a temperature of from about 0° C. to the solidification temperature of the chlorofluorocarbon.

5. The process of claim 1 further comprising mixing water with the cooled dispersion of claim 1(c) to form a solvent-water phase and a polymer-chlorofluorocarbon mixture, removing the solvent-water phase by decantation; and removing the chlorofluorocarbon by sublimation at a temperature of from about 0° C. to the solidification temperature of the chlorofluorocarbon.

6. The process of claim 1 further comprising mixing water with the cooled dispersion of claim 1(c) to form a solvent-water phase and a polymer-chlorofluorocarbon mixture; removing the solvent-water phase by decantation; removing substantially all of the chlorofluorocarbon by aspiration at a temperature at which the chlorofluorocarbon is liquid; and removing any residual chlorofluorocarbon by vaporization.

7. The process of claim 1 in which the starting polymer is selected from the group poly(hexamethyleneadipamide), poly(ethylene terephthalate) and polyoxymethylene.

8. The process of claim 1 in which the chlorofluorocarbon is at least one of 1,1,2,2-tetrachloro-1,2-difluoroethane and 1,1,1,2-tetrachloro-2,2-difluoromethane.

9. A process of claim 1 in which the amount of the chlorofluorocarbon used is such that the resulting polymeric microporous, open-celled, cellular structure is coherent.

10. A process of claim 1 in which the amount of the chlorofluorocarbon used is such that the resulting polymeric microporous, open-celled, cellular structure is particulate.

11. A process according to claim 1 further comprising adding to the dispersion of the chlorofluorocarbon in the polymer solution prior to the cooling step a chlorofluorocarbon miscible anionic, cationic or nonionic surfactant in an amount of up to 3 weight per volume percent of said dispersion.

12. A process according to claim 11 wherein the surface active agent is anionic and is selected from the group consisting of fatty carboxylic acids, sulfuric esters, alkane sulfonic acids and alkylarylsulfonic acids.

13. A process according to claim 11 wherein the surface active agent is cationic and is selected from the group consisting of fatty amines and quaternary ammonium compounds.

14. A process according to claim 11 wherein the surface active agent is monionic and is selected from the group consisting of polyoxyalkylene ethers of higher fatty acids and alkylphenols.

15. A dispersion of a polymer selected from th group consisting of polyamide, polyester and polyacetal prepared by a. dissolving at least 0.3 weight per volume percent of the selected polymer in a solvent selected from the group consisting of hexafluoroisopropyl alcohol, hexafluoroacetone hydrate, formic acid, and mixtures thereof to form a polymer solution, with the proviso that formic acid is utilized either alone or in mixture only when the selected polymer is polyamide, and (b) dispersing in the resulting solution from about one to about 10 times its volume of a liquid chlorofluorocarbon or mixture of chlorofluorocarbons having a boiling point in the range of from about 10° to 150° C., a melting point in the range of from about −40° to 125° C., an entropy of fusion of less than 10 calories/°K/mole, a plastic flow index of at least 0.1 g./10 min. at the reduced temperature of 0.96 to 0.99, and a solubility in water of less than about 2 weight percent at a temperature below the atmospheric boiling temperature of the lowest-boiling component of the polymer solution, to form a dispersion.

16. A dispersion according to claim 15 wherein the chlorofluorocarbon or mixture of chlorofluorocarbons is selected from the group consisting of 1,1,1,2,2-pentachloro-2-fluoroethane, 1,1,2,2-tetrachloro-1,2-difluoroethane, 1,1,1,2-tetrachloro-2,2-difluoroethane, 1,1,1-trichloro-2,2,2-trifluoroethane, 1,2dichlorodecafluorocyclohexane, 1,1,2,2-tetrachloro-perfluorocyclobutane, 1,2-dichloroperfluorocyclobutane, 1-chloroperfluorocyclobutane, 1,1,2-trichloro-1,2,2-trifluoroethane, 1,1,1,3-tetrafluoro-2,2,3,3-tetrachloropropane, 1,1,1,3,3-pentafluoro-2,2,3-trichloropropane, 1,1,1,3,3,3-hexafluoro-2,2-dichloropropane, 1,1,1,4,4,4-hexafluoro-2,2,3,3-tetrachlorobutane and mixtures thereof.

17. A plastic, pliable, moldable, and extrudable composition of matter obtained by a. cooling the dispersion of claim 15 to at least the solidification temperature of the lowest-melting chlorofluorocarbon present;

b. mixing with the cooled dispersion sufficient water to substantially precipitate the polymer; and c. removing the solvent-water phase.

* * * * *